A. J. RIDDLE.
FOLDABLE SINK RACK.
APPLICATION FILED JULY 17, 1919.

1,373,975.

Patented Apr. 5, 1921.

Inventor
A. J. Riddle,
By Geo. P. Kimmel,
Attorney

UNITED STATES PATENT OFFICE.

ARTHUR J. RIDDLE, OF ERIE, PENNSYLVANIA.

FOLDABLE SINK-RACK.

1,373,975.      Specification of Letters Patent.      Patented Apr. 5, 1921.

Application filed July 17, 1919. Serial No. 311,481.

*To all whom it may concern:*

Be it known that I, ARTHUR J. RIDDLE, a citizen of the United States, and resident of Erie, in the county of Erie and State of Pennsylvania, have invented certain new and useful Improvements in Foldable Sink-Racks, of which the following is a specification.

The invention relates to a rack, and more particularly to the class of foldable racks for use in sinks or other places where applicable.

The primary object of the invention is the provision of a rack of this character, wherein the same is constructed so that it can be placed within a sink to protect the latter when washing dishes, cooking utensils or the like, so as to avoid damage to the sink and to the utensils, the rack being readily foldable when not in use.

A further object of the invention is the provision of a rack of this character which can be readily folded when not in use and extended for use, the rack being of the required size to properly fit within the sink and to be supported slightly elevated from the bottom of said sink to avoid any damage to the sink when washing dishes or the like.

A still further object of the invention is the provision of a rack of this character, which is extremely simple in construction, very reliable and efficient in its purpose, strong, durable and inexpensive to manufacture.

With these and other objects in view, the invention consists in the features of construction, combination and arrangement of parts, as will be hereinafter fully described, illustrated in the accompanying drawing and pointed out in the claim hereunto appended.

In the accompanying drawings.

Similar reference characters indicate corresponding parts throughout the several views in the drawings.

Figure 1:
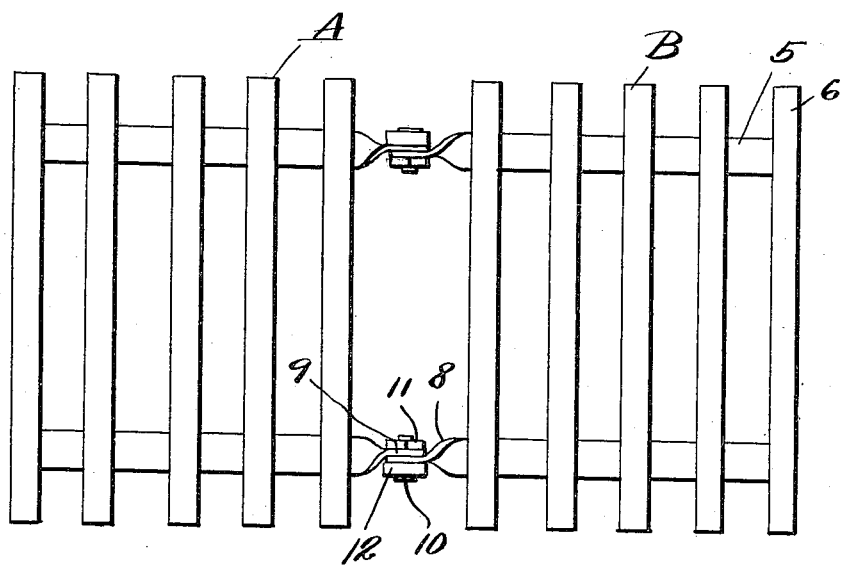
Figure 1 is a top plan view of a rack constructed in accordance with the invention, the same being shown extended for use.

Referring to the drawing in detail, the rack comprises complementary sections A and B, each including a pair of spaced parallel longitudinal strips 5 and spaced parallel transverse strips 6, the latter being superposed upon the strips 5 at the required intervals and are fastened thereto through the medium of screws 7 which are passed through the strips 5 from the underside thereof, the strips 6 being of equal length with respect to each other and when fastened to the strips 5 by the screws 7 form a rigid unitary structure. The strips 5 are preferably made from metal, while the strips 6 are made from wood, although the same may be made from any other suitable material.

The strips 5 at one end of each frame are twisted at 8 to form pivot ears or eyes 9 and passed through the latter are pivot bolts 10 which carry the usual nuts 11, so that in this manner the sections A and B are swingingly connected to each other for permitting the folding of the rack when not in use.

Figure 2:
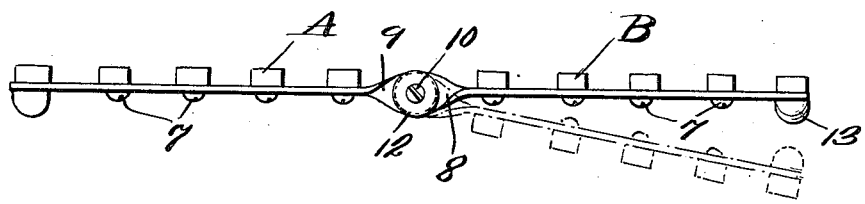
Fig. 2 is a side elevation, looking toward one side edge thereof, the sections of the rack being shown by full lines in the same plane with each other, while by dotted lines one section of the rack is shown at a slight inclination.

Carried by the pivot bolts 10 are rollers 12, which constitute center supports for the rack to elevate the same medially from the bottom of the sink when the rack is placed therein for use, the peripheries of the rollers projecting beyond the edges of the ears 9 as shown in dotted lines in Fig. 2.

Suitably mounted on the strips 5 near the outer ends thereof are resilient feet in the form of buttons 13, which constitute the outer support for the rack to hold the outer ends of the sections thereof elevated from the bottom of the sink, so that both sections will lie in the same plane with each other when the rack is placed upon the bottom of the sink for use.

It will be apparent that when the rack is placed within the sink upon the bottom thereof or upon the draining board or any other support the sections A and B are slightly elevated from said support so that dishes, cooking utensils or the like resting thereon can readily drain and at the same time will be prevented from contacting with the support and also in event that any one of the dishes or cooking utensils is dropped the rack will prevent said dish or utensil striking the bottom of the sink and thereby breaking or otherwise damaging the same.

The rack is made the required size to properly fit within the sink upon the bottom thereof and will constitute a support for articles to be washed therein without any possibility of damage to the sink in the washing of such articles.

From the foregoing it is thought that the construction and manner of use of the rack will be clearly understood and therefore a more extended explanation has been omitted.

What is claimed is:

A foldable rack of the class described composed of a plurality of hingedly connected sections, each comprising a pair of parallel laterally spaced flat metal bars with one end of each twisted to position the terminal thereof at right angles to its flat face, said terminals being apertured, pintles in the apertures, spaced slats connecting the bars of each section, the free ends of the sections having feet with rounded soles or support engaging portions, and rollers carried by said pintles with the peripheries thereof extending beyond the edges of said terminals to coöperate with said feet to support the rack spaced from its support and to facilitate its movement over said support.

In testimony whereof I affix my signature hereto.

ARTHUR J. RIDDLE.